United States Patent [19]

Lewis, Jr.

[11] Patent Number: 5,158,124
[45] Date of Patent: Oct. 27, 1992

[54] DOUBLE-END ROUND TOP COMPONENT CUT-OFF SAW

[75] Inventor: John W. Lewis, Jr., Urbana, Ill.

[73] Assignee: Aluminum Company of America, Pittsburgh, Pa.

[21] Appl. No.: 770,940

[22] Filed: Oct. 4, 1991

[51] Int. Cl.⁵ .................... B27B 1/00; B27B 5/00
[52] U.S. Cl. .................... 144/2 R; 83/471.3; 83/485; 83/486.1; 83/488; 144/49; 144/256.1; 144/269; 144/363; 144/379
[58] Field of Search .............. 83/471.3, 473, 485, 83/487, 486.1, 461, 488; 144/2 R, 3 R, 5, 49, 256.1, 259, 269, 270, 359, 363, 379

[56] References Cited

U.S. PATENT DOCUMENTS

| | | | |
|---|---|---|---|
| 927,975 | 7/1909 | Kaufman et al. | 144/256.1 |
| 1,862,414 | 6/1932 | McAlister | 144/259 |
| 4,131,143 | 12/1979 | Mayo | 83/488 |
| 4,688,612 | 8/1987 | Kessel et al. | 144/3 R |

Primary Examiner—W. Donald Bray
Attorney, Agent, or Firm—Dressler, Goldsmith, Shore, Sutker & Milnamow, Limited

[57] ABSTRACT

A machine for cutting off the waste end portions of semi-circular or semi-elliptical members used for framing windows. The curved members are held in the desired fixed relationship by clamping members and saw mechanisms are transversely movable adjacent each end to perform the cutting action. When two halves are to be cut simultaneously they are clamped in transversely spaced relationship so the ends are cut during one pass to insure that the two halves will accurately form a full frame assembly.

12 Claims, 4 Drawing Sheets

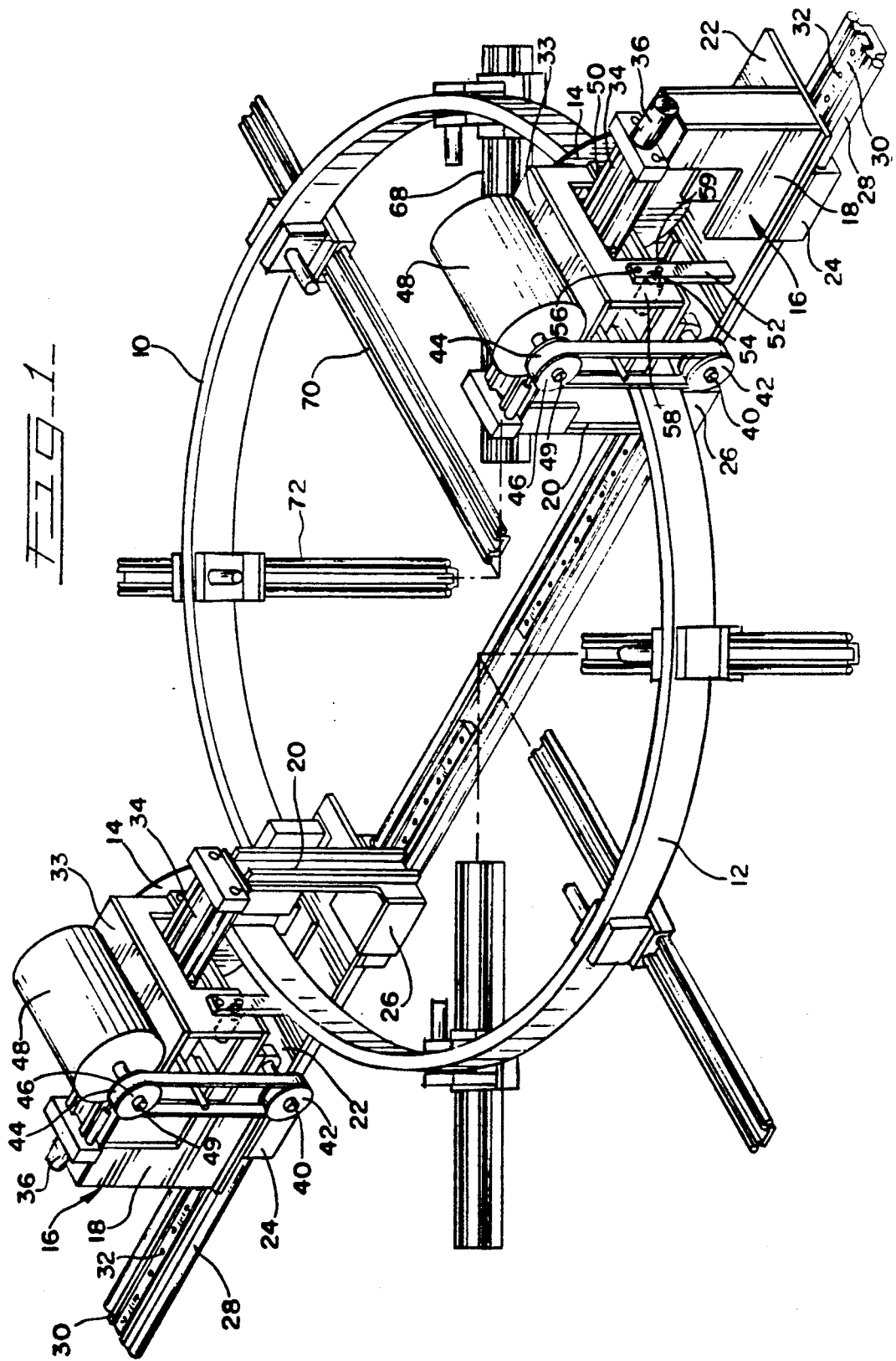

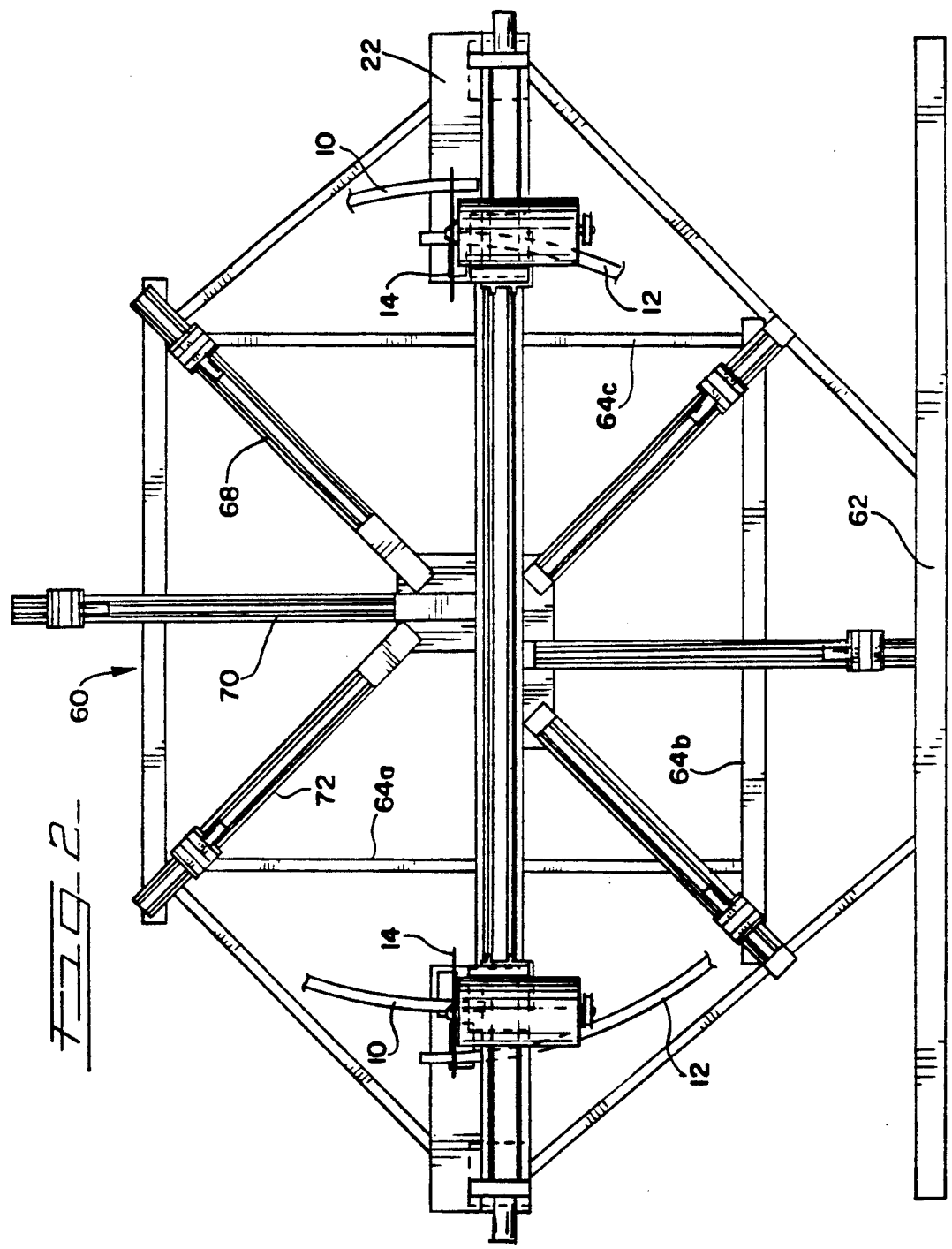

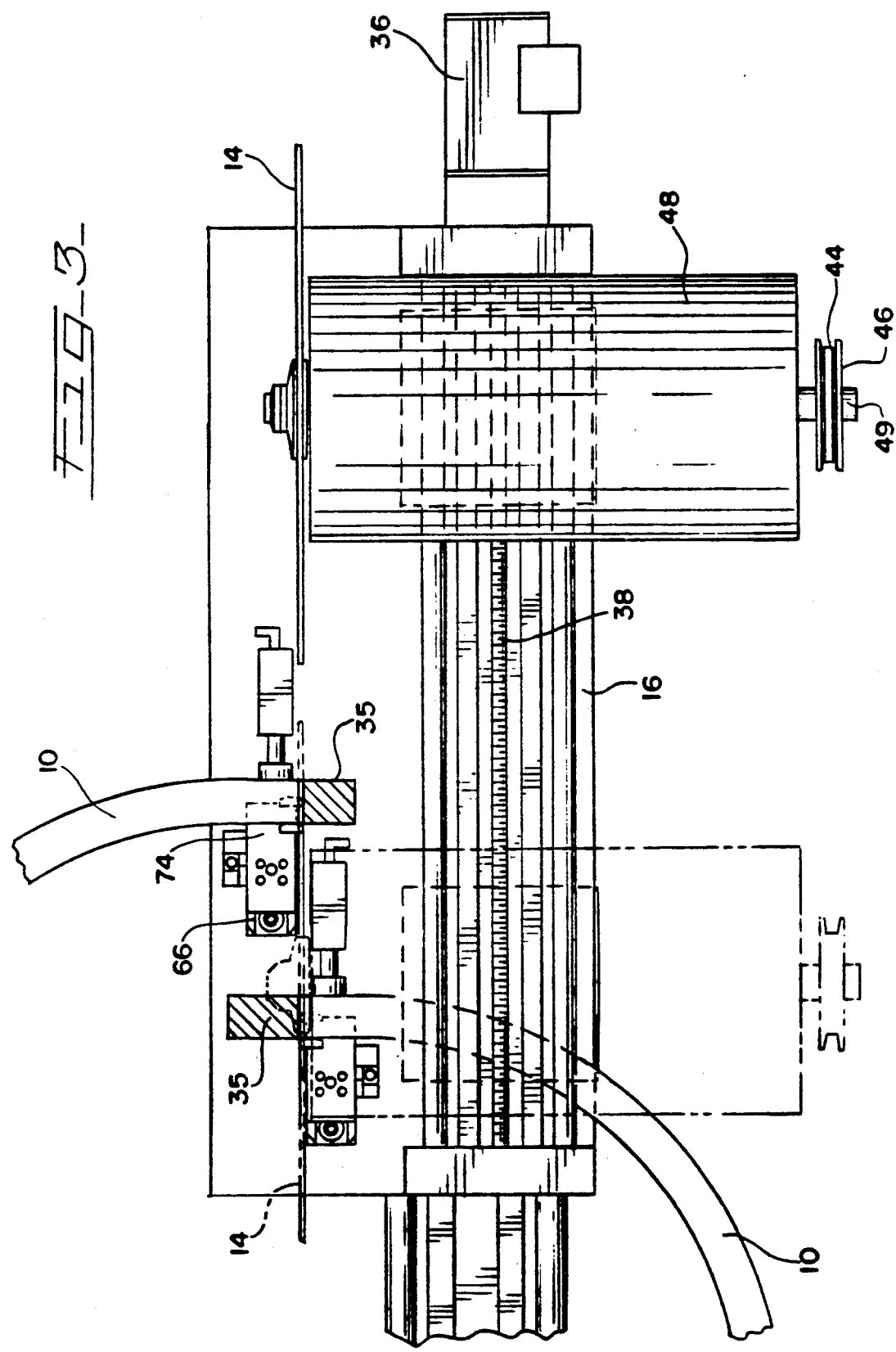

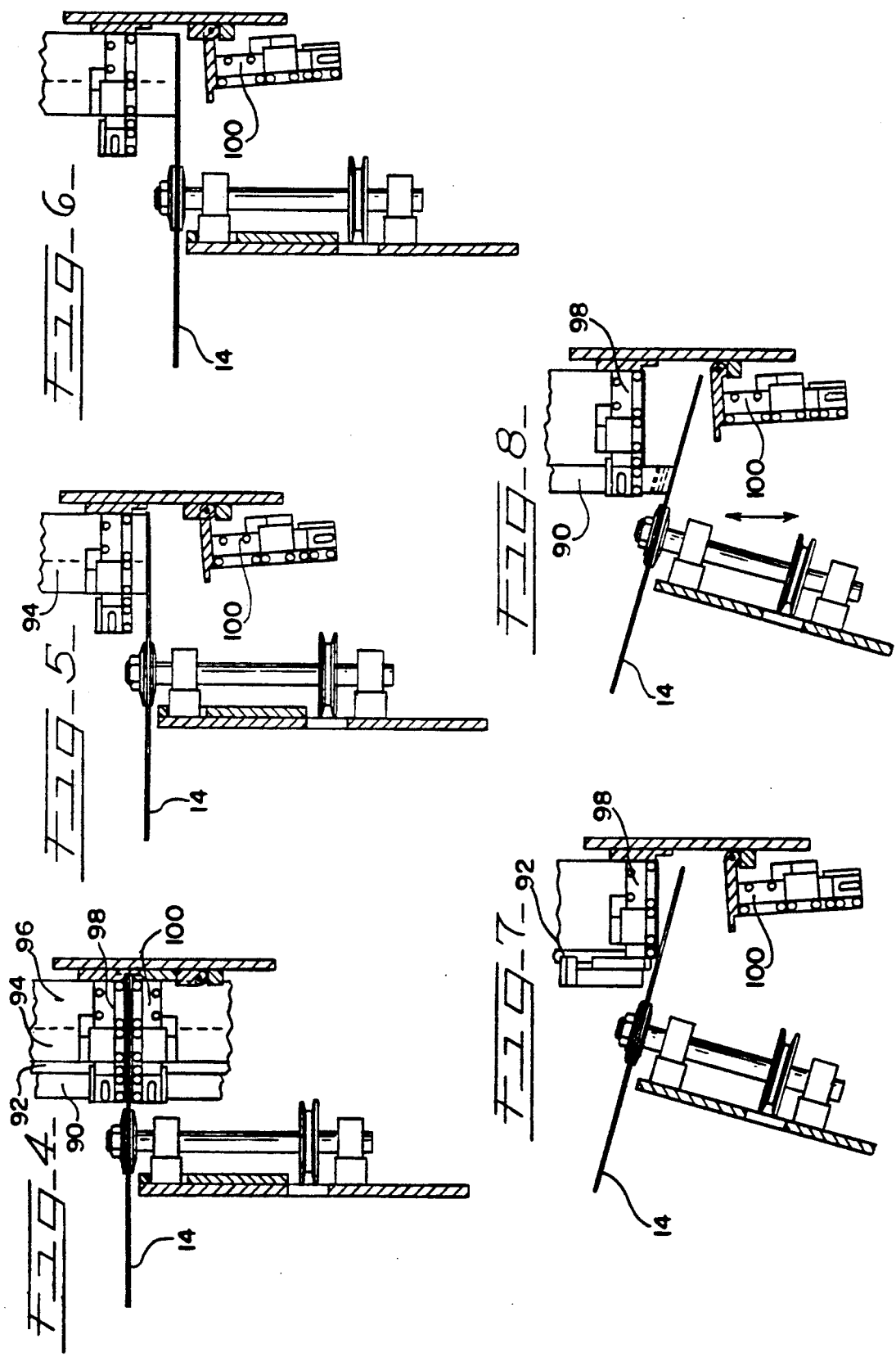

DOUBLE-END ROUND TOP COMPONENT CUT-OFF SAW

BACKGROUND OF THE INVENTION

This invention relates to a mechanism that can be readily used to cut elliptical, half round or full round frames for windows, curved casings, and architectural components made of wood, aluminum, or vinyl.

The manufacture of such frames has conventionally been done manually by placing the component into a fixture to be cut, marking off where it is to be cut and then manually performing the cutting operation. The component to be cut was clamped into the desired position by C-clamps, and the end or waste portions were cut off by an operator by first cutting one end and then the other. It usually required two workers, with one to hold the end of the frame not being cut and the other to operate the saw. It can be appreciated that this is very slow, inefficient, and unduly expensive.

In addition to the aforementioned, it required a number of fixtures to accommodate different sizes of half-rounds, etc., to be cut. In addition, when cutting the two half-rounds separately, the operator could not be sure that when they were mated to become a full round that they would match.

SUMMARY OF INVENTION

In accordance with the present invention, there is provided a single mechanism which can be readily adjusted to cut both ends of a half-round and during the same sequence cut two ends of another half-round, which half-rounds are to be mated to form a full round window, or the like. If a half-round is all that is being cut, this can be done separate and apart from a full round, but applicant's novel apparatus has the flexibility of being able to be used to cut both half-rounds during the same sequence. The same would apply to full- or half-elliptically shaped frames. While the description will be directed to circular configurations, it can be appreciated that it similarly applies to elliptical arrangements.

The mechanism consists of providing a simple to operate, readily and accurately adjustable clamping arrangement which will hold each of the half-rounds in the proper position, so that any end portions to be cut off can be eliminated by transverse movement of the saw carriage assembly and associated power-driven saw blade.

The clamping assemblies are designed so that when the half-rounds are clamped in position the end portions of each half-round are transversely spaced from each other but are positioned to be cut so that when the cutting is completed they will be matched to form an accurate full-round frame if desired.

The clamping mechanisms in the illustrated embodiment for each half-round consist of three separate air actuated clamps located intermediate the ends of each half-round and a separate clamping mechanism for holding each end portion in position relative to the saw carriage assembly so the end portions can be cut off. The clamping mechanisms are readily adjustable to accommodate different radii of components to be cut. Essentially, there are tracks provided on which the clamps are mounted, which clamps can be readily adjusted to accommodate the different radii above referred to. At opposite ends of a diameter of the half-rounds to be cut, are located two transversely movable saws mounted on carriages, which carriages can be automatically operated to cut off the waste portions of the components being cut. These saws can be mounted at a 90° angle relative to the ends being cut, or can be adjusted slightly to have a tapered end. To effect this, the saw carriages are pivotally mounted relative to the guides on which are mounted clamping devices that are used to support the components being cut. The clamping mechanism permits the assemblage of all of the components of the frame assembly, or as few of them as desired to be cut at one time. Thus, if it is desired to cut off an assemblage consisting of one or more of the following components, such as a wood frame, blind stop, brick mould and glazing strip, they are assembled together, clamped in place, and the saw carriage and saw are activated to cut off the ends to provide a uniform surface. In accordance with the illustrated embodiment, the machine is oriented in a generally vertical orientation to reduce the required floor space.

In the embodiment of the present invention, the novel machine has the ability to simultaneously cut to length two half-round members of a wide range of sizes on the order of 10-50 inch radii. The clamping mechanisms in conjunction with the Thompson guides are readily adjustable to facilitate rapid changes and setups from one component to another. The mounts thus allow the machine to cut a "family" of different radius parts without changing the location of the entire mount assembly. Furthermore, elements on the mounting assemblage are designed so they can be pivoted out of or into the clamping area, thereby allowing different parts within the same "family" of radius to be cut concurrently, or separately. As many as eight curved components (two sets of four) can be cut concurrently. There is thus eliminated the need to measure and mark each frame prior to cutting, which in the past made for a very laborious and time-consuming situation. It has been found that when compared to conventional methods of producing frames, utilizing such a machine takes only 20-30% of the time and personnel than it normally took when it was done in the conventional manual fashion.

As further disclosed in the various drawings, it will be shown how full round cutting consisting of cutting all of the frame parts simultaneously of both halves can be accomplished; half-round cutting of one frame and similar cutting arrangements for different types of windows and also views showing how the saw blade is tilted to accommodate tapered cutting, or to only cut portions of the frame, as desired.

As will be seen from the following drawings, there is illustrated a preferred embodiment of the invention, but this can be modified as desired within the true spirit and scope of the invention.

DESCRIPTION OF THE DRAWINGS

FIG. 1 illustrates a plan view of the apparatus showing the cutting of both ends of half-rounds which can be matched to form a full round frame;

FIG. 2 is a view showing the support frame for the various mechanisms and the mechanism located in a substantially vertical position to minimize space requirements;

FIG. 3 is an enlarged view showing the clamping of the adjacent ends of two half-rounds in position and the mechanism for moving the saw into and out of its cutting position;

FIG. 4 shows an elevational view of the saw blade cutting an end of a group of frame parts simultaneously;

FIG. 5 shows the cutting of one frame and a glazing stop pair;

FIG. 6 shows the cutting of a clad casement only with half-round cutting of one frame and glazing stop pair;

FIG. 7 shows cutting of a radial blind stop of a half unit with the saw tilted at an angle of 15° for bevel cutting of beveled components; and FIG. 8 illustrates the cutting of a brick mould.

DESCRIPTION OF THE PREFERRED EMBODIMENT

Referring now to FIG. 1, there is illustrated a generally perspective assembly view of the apparatus forming the invention. The two half-rounds being cut and shown in position FIG. 1 is usually made up of a laminate of wood materials or other types of materials that have been bent into the configuration desired. The mechanism is designed to clamp the material in a semi-circle form so that it will retain its shape during the cutting action. The frame as originally constructed will be shaped so that the ends are longer than required and will have to be cut off to obtain the accurate size for the window to be framed. The material is clamped intermediate the semi-circle form, and the ends are clamped in position within the semi-circle leaving the waste portions exposed so the saw can readily be moved transversely with respect thereto to cut off the end portions. Aa aforementioned, all of the clamps are adjustable and can be clamped into position to form a semi-circle having a wide range of diameters.

There is illustrated in FIG. 1 the cutting of two half-frames 10 and 12 by the saws 14 mounted on the two diametrically disposed saw carriage assemblies 16. The saw carriage assemblies consist of front and rear supports 18,20 mounted on a main base plate 22 that has secured to its underside two slides 24,26 that are mounted on guide tracks 28 formed as part of the Thompson guides. Located within the guide track 28 is an index bar 30 which is bolted to the guide track 28 in a conventional manner, not shown. Located in the index bars are holes 32 into which fit pins (not shown) depending from the support of the saw carriage 16 to locate the saw carriage relative to the guide track 28. Each of the Thompson guide tracks is substantially identical, and thus only one will be described in detail.

The saw carriage assembly 16 includes a saw box 33 that slides on a guide 34. The saw carriage assembly 16 is moved back and forth by operation of an air motor 36 that drives a screw 38 shown in detail in FIG. 3. Thus, operation of the air motor 36 through the action of the screw 38 will operate to drive saw box 33 back and forth to move the saw 14 to cut off the waste ends 35 of each half-round. The saw 14 is rotated at a high speed through the action of a shaft 40 on which is mounted a pulley 42. The pulley 42 is driven by belt 44 that is in turn driven by a pulley 46 that is driven by the saw motor 48 through shaft 49.

As previously mentioned, it is sometimes desirable to cut the ends off at an angle on the order of 15°. To accomplish this, the saw box is pivotally mounted by means of a pivot pin 50 connected to a frame member, not shown, mounted on the main base plate 22. There is provided an indexing plate 52 which is also secured to the main base plate 22. The indexing plate 52 has two openings 54 and 56 that are separately engageable by a piston-driven assembly 58 secured to the saw box which includes an axially movable pin 59. Thus, when the saw box is to be in the position illustrated wherein the blade is disposed at an angle of 90° relative to the end being cut, the pin 59 is located in opening 54. When the saw is to be tilted 15°, the piston assembly 58 is operated to disengage pin 59 from opening 54, the saw box is pivoted about pin 50, and the pin 59 is extended into the opening 56, which will affix the saw box in the position wherein the blade will be tilted as desired to make a bevel cut. It can be appreciated that the saw motor, pulleys, drives, and shafts are all interconnected to the saw box 33 and therefore will move with the saw box 33 when it is pivoted to change the orientation of the saw blade 14.

Referring now to FIG. 2, there is shown the support frame 60 which is disposed in a substantially vertical position in that it is inclined only on the order of 15° from the vertical and is employed in this position to minimize space requirements. It is essentially a tubular steel frame which is supported on an elongated base member 62 and includes various frame members 64a, b, c, etc. to which the Thompson guides are secured, as well as the base plates forming the support for the saw guides. The framing mechanism can, of course, take whatever form necessary to form the necessary support for the guides, saw carriage assemblies, etc., and this arrangement is just one of many that can be employed.

In FIG. 3, there is shown a plan view of the saw assembly and the clamping mechanism for retaining the ends of the wood or metal assembly in position during the saw cutting actions. It can be appreciated that when it is desired to cut two half-rounds at the same time, they have to be transversely spaced as shown, and also, when located in this manner they will match if the clamping mechanisms for holding each of the halves of the full round to be formed is fixed in comparable positions.

In order to maintain each of the half-rounds in their proper semi-circular orientation, there are provided five separate clamping mechanisms for each of the half-rounds. Three of the clamps are located intermediate the ends at 45° spacing, and each end is clamped to form the complete semi-circle.

As previously mentioned, each of the Thompson guides is provided with indexing holes that are identically spaced with respect to each of the guides forming the separate semi-circles, so that locations of the clamping mechanisms on the guides in corresponding holes will result in the half-rounds being clamped in the proper position to form the desired semi-circle. The clamping assembly mounted on each of the Thompson guides is substantially identical with that shown in FIG. 3, and thus the discussion of the clamping arrangement described with respect to FIG. 3 will apply equally to the clamping mechanisms found on the three intermediate clamps and guide assemblages disposed intermediate the ends of each of the half-rounds being clamped in position.

As shown in FIG. 3, there is illustrated the clamping mechanism for the ends of adjacent half-rounds 10, 12 being cut by the saw blade 14. FIG. 3 is consistent with FIG. 1 in that it shows the adjacent ends of the half-rounds transversely spaced relative to each other in order to be able to accomplish cutting off of the ends of the transversely spaced half-rounds and to insure that they will match when the two half-rounds are secured together to form a full round. As aforementioned, the clamping mechanism that is going to be discussed in conjunction with FIG. 3 is substantially identical with the clamping mechanisms that are found on each of the other guides illustrated in FIG. 1, as well as the clamping mechanisms for the other end of the half-rounds not shown in FIG. 3. Thus, there will be clamping mechanisms on each of the three Thompson slides located intermediate the ends of each of the half-rounds, and the clamping mechanism for the ends adjacent the saw carriage located diametrically opposite the one that has been described in detail with respect to FIG. 3 will contain a similar construction.

Specifically, the half-rounds 10,12 are clamped into position prior to cutting by separate support and clamping mechanisms that consist of a first guide 66 located adjacent the saw on both sides of the half-round 10, three additional guides 68,70,72 as shown in FIGS. 1 and 2, and a fourth guide (not shown) for retaining the other end of the half-round 10 in position. The other half-round 12 is held in position by comparable clamping mechanisms. The specific clamping mechanism consists of a clamp point block 74 that is adjustably connected to short guides 66 at each end of the half-round 10. Also secured to short guides 66 is an air clamping device 76 that is operated to bias the end of the half-round 10 to be cut up against the clamp point block 74. As aforementioned, on each of the three guides located intermediate the ends of the half-round 10 and at the other end of the half-round 10, there are similar clamping mechanisms that are shown schematically and which are operated and positioned to retain the half-round in its proper position during the cutting removal of the waste portions 35 at the ends of the half-round.

As noted in FIG. 3, the adjacent half-rounds having their waste ends cut off are transversely spaced so that the mechanism can be used to support the two half-rounds at one time, which two half-rounds are to be connected together to form a single circular window. When the half-rounds are mounted in the position as shown in FIG. 1, the saws will be automatically operated to cut the waste ends off the ends of the half-rounds located relative to each of the two saw carriage assemblies. The air lines and electric lines for the various motors and clamps are very conventional and illustration thereof is not necessary for an understanding of the present invention. As aforementioned, the controls for the saws operate to move them inwardly to perform the desired cutting action and then they will automatically reverse themselves to return the saw carriage to the starting position, which is shown in solid lines in FIG. 3.

Referring now to FIGS. 4 through 8, there are shown the arrangements for cutting various components of a frame at the same time.

Each of the six intermediate guides contains a clamp point block against which a section of the half-round is biased against its respective clamp point blocks by a clamping motor. In each of the end portions, as shown in FIG. 3, there are clamp point blocks used for forming backup stops against which the ends of the half-rounds are biased by the provided clamping motor. The five views wherein various combinations of components are cut concurrently are shown in FIGS. 4 through 8.

FIG. 4 shows the cutting of a full round arrangement consisting of a brick mould 90, a blind stop 92, a glazing stop 94, and a wood frame 96, and the clamping point blocks 98,100 are located in proper position. In this case, all frame parts are being simultaneously cut.

In FIGS. 5, 6, 7, and 8, the components are cut concurrently, and the lower clamp point block 100 is pivoted out of the way since it is not utilized in such cutting configurations. Referring to FIG. 5, there is shown half-round cutting of one frame and a glazing stop pair 94. In FIG. 6, there is shown the cutting of a clad casement only of one frame and a glazing stop pair 94. FIG. 7 shows a radial blind stop 92 cutting off all half-round units, with brick mould pivot stop swung away. FIG. 8 shows a view similar to FIG. 7 in which the brick mould 90 can be cut in five different positions.

Method of Operation

When operating the novel double-end round top cut-off saw arrangement, the half-rounds 10,12 are located in position as shown in FIG. 1, with the ends transversely spaced relative thereto. The air motors 36 of the two saw carriage assemblies are operated to rotate the screw 38, which moves the entire saw box 33 containing the saw motor, drive mechanism and saw blade of each carriage assembly inwardly to cut off the waste ends 35 of the two half-rounds 10,12. The two half-rounds 10,12 are clamped in position by the clamping mechanisms located on the Thompson guides to retain the half-rounds in the fixed position during the cutting action. When the saw completes its cutting movement, it automatically withdraws. This can be done very quickly and efficiently and requires only a minimum of operator setup time. When the saws have completed the cutting action, the air motors on each of the guides are operated to release the clamps, thus allowing the two half-rounds to be removed from the assembly. Immediately thereafter, if the same diameter half-rounds are to be cut, they can be installed in place, but if half-rounds of different diameters are to be cut, then the clamping mechanisms will be readjusted on the Thompson guides, the new half-rounds inserted in place, and the waste ends then cut off.

These are intended to be merely representative of the various ways in which the cutting mechanism can be used cutting various components.

It is intended to cover by the appended claims all such modifications as fall within the true spirit and scope of the invention.

What is claimed is:

1. A machine for precision cutting of the ends of curved members comprising frame means, guide means for supporting a curved member on the frame means, a plurality of spaced clamping means disposed on said frame means for retaining a curved member in a desired orientation, sawing mechanisms including a saw disposed on opposite sides of the frame means for cutting off the ends of the curved member for finishing the same, a holder for said sawing mechanisms, said sawing mechanisms including a motor, a support for said saw, track means for guiding said support and saw during its cutting action, and automatically operable motor means on said holder for effecting cutting action of said saw by moving the saw support back and forth on said track means.

2. A machine for precision cutting as set forth in claim 1 in which means are provided for pivotally mounting said saw support relative to said holder to effect angular positioning of the saw to accomplish angular cutting of the ends of the curved member.

3. A machine for precision cutting of the type as set forth in claim 2 in which the spaced clamping means includes fluid actuating clamping devices located on each of said guides for clamping the annular member in its desired position.

4. A machine for precision cutting as set forth in claim 3 in which there are located means on said guides for adjusting the clamping devices for accommodating curved members of various semi-elliptical, or semi-circular configurations.

5. A machine for precision cutting as set forth in claim 3 in which air motors are provided for moving said saw and for operating said clamping means for maintaining the curved members in the desired position.

6. A machine for precision cutting as set forth in claim 1 including bracing means for supporting said frame means in a generally vertical position for minimizing the space taken up by such machine.

7. A machine for precision cutting off the ends of two halves of matching curved members comprising frame means, guide means for supporting each of the halves on the frame means with their ends in transversely spaced coplanar relationship, a plurality of spaced clamping means disposed on said guide means and orientated to form the periphery of the elliptical or circular configuration that the two halves of the shape is to form, the clamping mechanisms being disposed so that the cooperating ends of the two halves are transversely spaced and juxtaposed to effect cutting off of the waste portions of each half end during finishing, sawing mechanisms disposed on opposite sides of the frame means for cutting off the ends of the transversely spaced halves, said sawing mechanisms each including a saw a motor driving said saw, a support for said saw, track means for guiding said support and saw during its cutting action, and automatically operable motor means on said holder for effecting cutting action of said saw by moving said saw support on said track means to cut off the ends of said transversely spaced curved members to insure that the two halves of the frame will match when assembled to form a complete unit.

8. A machine for precision cutting as set forth in claim 7 in which means are provided for pivotally mounting each of said saw supports relative to its holder to effect angular positioning of the saw to accomplish angular cutting of the ends of the curved members.

9. A machine for precision cutting of the type as set forth in claim 8 in which the spaced clamping means includes fluid actuating clamping devices located on each of said guides for clamping each of the annular members in its desired position.

10. A machine for precision cutting as set forth in claim 9 in which there are located means on said guides for adjusting the clamping devices for accommodating curved members of various semi-elliptical, or semi-circular configurations.

11. A machine for precision cutting as set forth in claim 9 in which air motors are provided for moving said saw means and for operating said clamping means for maintaining the curved members in the desired position.

12. A machine for precision cutting as set forth in claim 7 including bracing means for supporting said frame means in a generally vertical position for minimizing the space taken up by such machine.

* * * * *